(12) United States Patent
Krass et al.

(10) Patent No.: US 6,453,531 B1
(45) Date of Patent: Sep. 24, 2002

(54) AUTOMOTIVE WINDOW ASSEMBLY TOOL

(75) Inventors: Craig R. Krass; Roger A. Johnson, both of Rockford, IL (US); Lisa Fugate, Bloomfield, MI (US); Craig A. Johnson, Rockford; James C. Shur, Curkirkland, both of IL (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/657,988

(22) Filed: Sep. 8, 2000

(51) Int. Cl.[7] .................................................. B23P 19/04
(52) U.S. Cl. ........................................... 29/268; 29/229
(58) Field of Search .......................... 29/268, 229, 269, 29/281.1, 284; 254/120; 269/165, 143, 6, 212, 238, 157; 81/319, 321, 322

(56) References Cited

U.S. PATENT DOCUMENTS

| | | |
|---|---|---|
| 1,955,630 A | 4/1934 | Hall |
| 2,014,535 A | 9/1935 | Maca |
| 2,305,995 A | 12/1942 | Roberts |
| 2,679,091 A | 5/1954 | Stratton |
| 3,184,838 A | 5/1965 | Johnson |
| 3,448,508 A | 6/1969 | Passage |
| 4,169,306 A | 10/1979 | Krueger |
| 5,479,689 A | 1/1996 | Schmit et al. |
| 5,548,929 A * | 8/1996 | Larsen ........................ 49/441 |
| 5,661,886 A * | 9/1997 | Smith ...................... 29/243.56 |
| 5,829,123 A | 11/1998 | Shaslo et al. |
| 5,893,201 A * | 4/1999 | Myers ......................... 29/268 |
| 5,895,035 A * | 4/1999 | Bley .............................. 269/6 |
| 5,931,453 A * | 8/1999 | Brennan ..................... 269/258 |
| 5,953,863 A | 9/1999 | Shibanushi et al. |
| 6,175,998 B1 * | 1/2001 | Leo ............................. 29/268 |
| 6,189,190 B1 * | 2/2001 | Gillet .......................... 29/229 |

* cited by examiner

*Primary Examiner*—M. Rachuba
*Assistant Examiner*—Daniel Shanley
(74) *Attorney, Agent, or Firm*—Ralph E. Smith

(57) ABSTRACT

An assembly tool for setting a lateral position of a rear window panel placed on a window glass support surface of a rear window opening of an automotive vehicle is provided. The tool includes an upper jaw for extending over a C pillar of the automotive vehicle, the upper jaw has a weather strip channel contact member and an adjustable length extending finger with an extreme edge window contacting surface for setting a lateral position of the rear window panel within the window glass support surfaces. A lower jaw pivotally is connected with the upper jaw for contacting and gripping an inboard surface of the vehicle C pillar. A quick connect vice mechanism for closing the upper jaw and the lower jaw toward one another to grip the C pillar is also included.

10 Claims, 3 Drawing Sheets

AUTOMOTIVE WINDOW ASSEMBLY TOOL

FIELD OF THE INVENTION

The present invention relates generally to a tool used in the assembly of a window glass panel onto an automotive vehicle body. More particularly, the present invention relates to an assembly tool utilized for setting the lateral position of a rear window panel placed on a window glass support surface of a rear window opening of an automotive vehicle.

BACKGROUND OF THE INVENTION

Most automotive vehicles have a roof. The roof of the automotive vehicle is typically joined to the remainder of the car body by at least a pair of transversely-spaced front and rear pillars. The front pillar, which is adjacent to the windshield is referred to as the A pillar. The rear pillar, which is adjacent to the rear window opening is typically referred to as the C pillar. The C pillar's outer body is formed from two large sheet metal stampings. The first stamping is the roof panel and the second stamping is a rear quarter panel. The roof panel has an integral portion forming a depression for placement of the rear glass window pane and for forming an upper portion of the C pillar. The roof panel portion of the C pillar is typically placed in an over-lapping manner in connection with the C pillar portion of the rear quarter panel. The rear quarter panel also has a depression for the rear window pane. The rear quarter panel additionally forms the rear door opening and the rear side panel of the vehicle. The two body panels of the C pillar are fitted and welded together.

The rear window glass depression in the C pillar adjacent the rear window opening has two main surfaces. The first surface is a side surface and the second surface is the support surface which the window glass panel is supported on. Prior to the present invention, the support surfaces of the passenger side and driver side C pillars often had linear ridges which laterally positioned the rear window panel within the rear window opening. However, due to other manufacturing considerations, the prior ridges on some vehicles have been eliminated.

The rear window opening is formed by four sheet metal stampings which are welded together. Accordingly, several factors can generate variations in the window opening. Variations can be caused by (1) differences in the bending characteristics of the sheet metal; (2) the condition of the dies that make the stampings; (3) fixtures which position the sheet metal within the die; (4) fixtures which position the sheet metal during the welding process; and (5) variations in the welding process. Accordingly, in some instances, it was difficult to ensure a proper distance between the ridges to position the window glass panel. Often during the assembly process, a variation of the window opening is predictable and the variation will be a constant. Therefore, any fixtures used for positioning the window glass within the window opening should be able to be set to a desired position and also should be adjustable so that when a known variation is recognized, appropriate adjustment can be made.

SUMMARY OF THE INVENTION

The present invention provides an assembly tool for setting the lateral position of a rear window panel placed on a window glass support surface of a rear window opening in an automotive vehicle. The assembly tool includes an upper jaw for extending over the C pillar of the automotive vehicle. The upper jaw has a weather strip contact member to align it within the weather strip channel in the window opening of the C pillar. The upper jaw also has an adjustable length extending finger. The finger has an extreme edge window contact surface for contacting and setting the lateral position of the window panel.

The tool also has a lower jaw. The lower jaw has an extreme end pivotally connected to an extreme end of the upper jaw. The lower jaw has a contact surface for clamping contact against an inboard side of the C pillar. A first lever is provided having an extreme end pivotally contacted with the lower jaw. A second lever is provided, having an extreme end pivotally connected with the upper jaw and also pivotally connected with the first lever. Movement of the first lever towards the second lever causes the upper jaw and lower jaw to move toward one another to clamp onto the C pillar. A release lever is pivotally connected to the second lever wherein pivotal movement of the release lever causes the upper and lower jaws to be released from the C pillar. The present invention provides freedom to the assembly operator to laterally set the position of the window panel within the window glass opening on the window glass support in a relatively constant position irregardless of variations in the assembly process.

It is a feature of the present invention to provide an assembly tool for setting the lateral position of a rear window panel placed on a window glass support surface of a rear window opening of an automotive vehicle.

It is also a feature of the present invention to provide a tool as described which additionally can be adjusted to accommodate variations which can occur in the assembly process.

Other features of the invention will become more apparent to those skilled in the art upon a reading of the following detailed description and upon reference to the drawings.

DETAILED DESCRIPTION OF THE DRAWINGS

Figure 1:
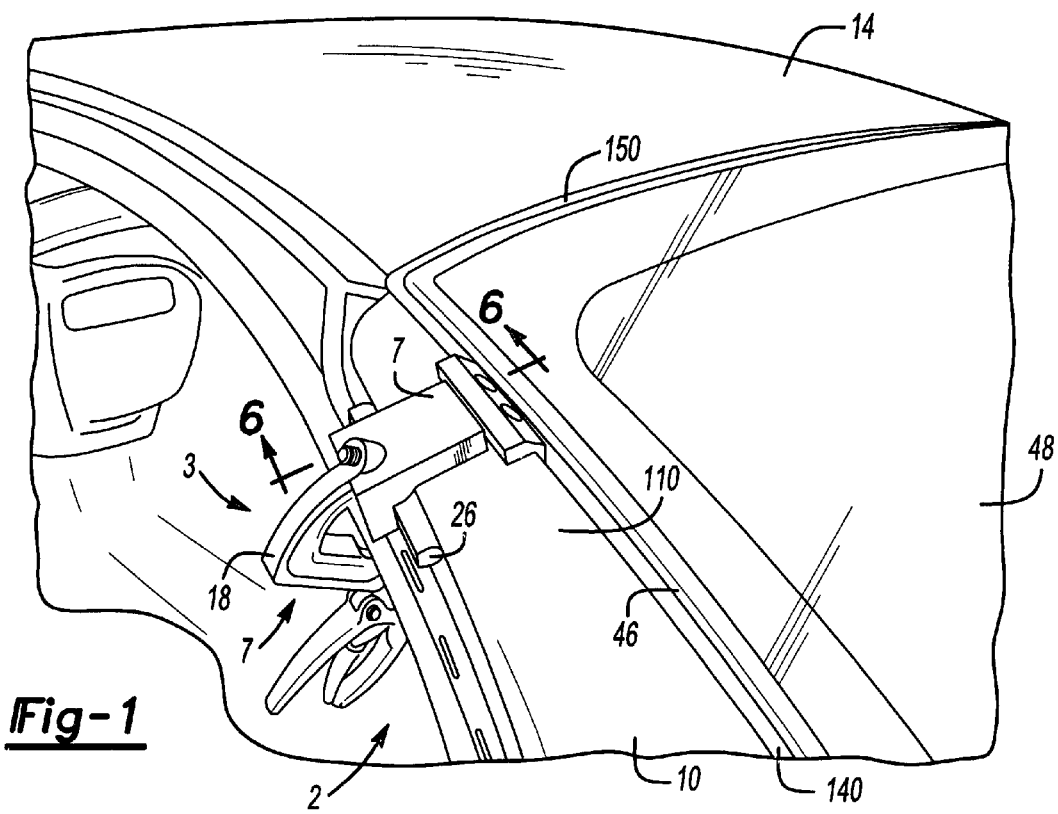
FIG. 1 is a perspective view of a preferred embodiment assembly tool for setting the lateral position of a rear window panel according to the present invention shown in the environment of being clamped onto the driver side C pillar of a passenger style automotive vehicle.

Referring to FIGS. 1–6 an assembly tool 7 according to the present invention is shown in position, gripping a C pillar 10 of an automotive vehicle 14. The tool 7 has an upper jaw 18 which is typically primarily metallic. In an extreme end of the metallic portion of the upper jaw 18, is a housing 22. Connected to the housing 22 is a weather strip channel contact member 26.

The housing 22 and the weather strip channel contact member 26 are typically fabricated from a polymeric material such as nylon or other suitable plastic. The contact member 26 has a flat 32 which mates with a lower leg 36 in the housing 22. Accordingly, the contact member 26 cannot rotate with respect to the housing 22. The housing 22 has an upper leg 38 and an adjustable length extending finger 40. The finger 40 has an extreme end 44 for contacting a lateral edge 46 of a rear window panel 48. The finger 40 has two blind bores 52 for receipt of set screws 54.

Penetrated by the set screws 54 and juxtaposed between finger 40 and housing 22 are shims 42. Rotation of the set screws 54 traps the shims 42 between the finger 40 and the housing 22, thereby setting the length of extension of the finger 40 from the housing 22.

Figure 2:
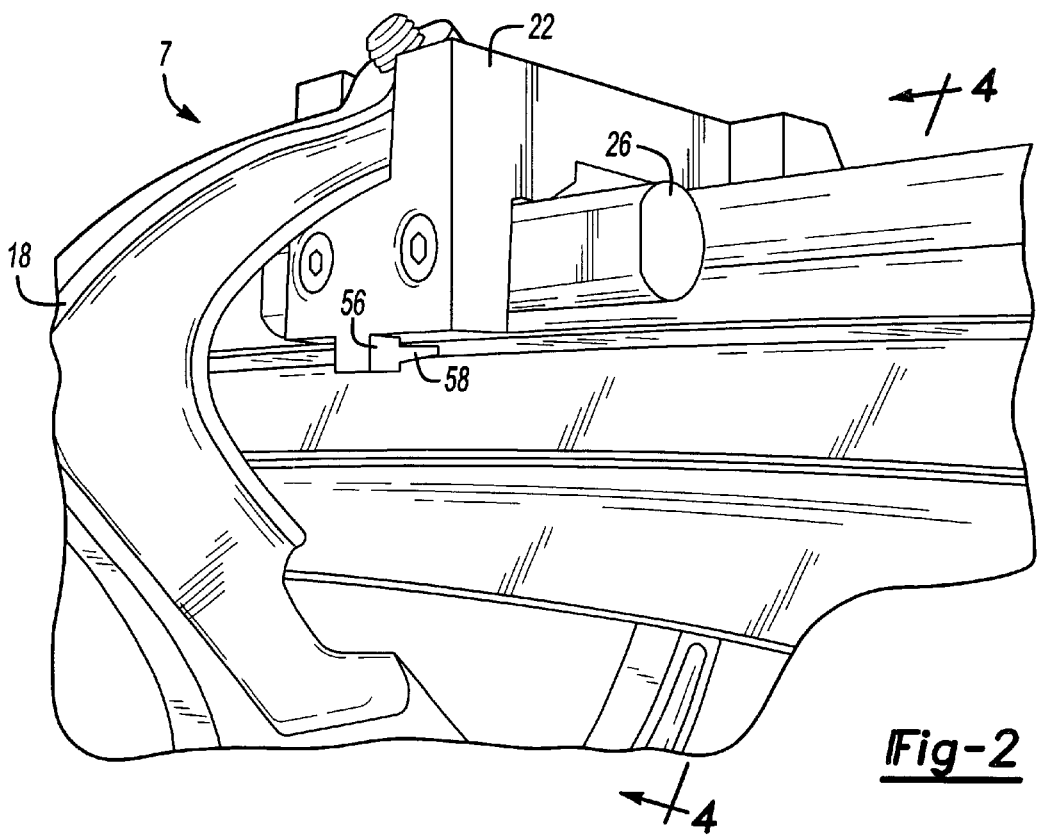
FIG. 2 is an enlargement of the assembly tool shown in FIG. 1 taken in the direction of arrow 2 in FIG. 1.
Figure 4:
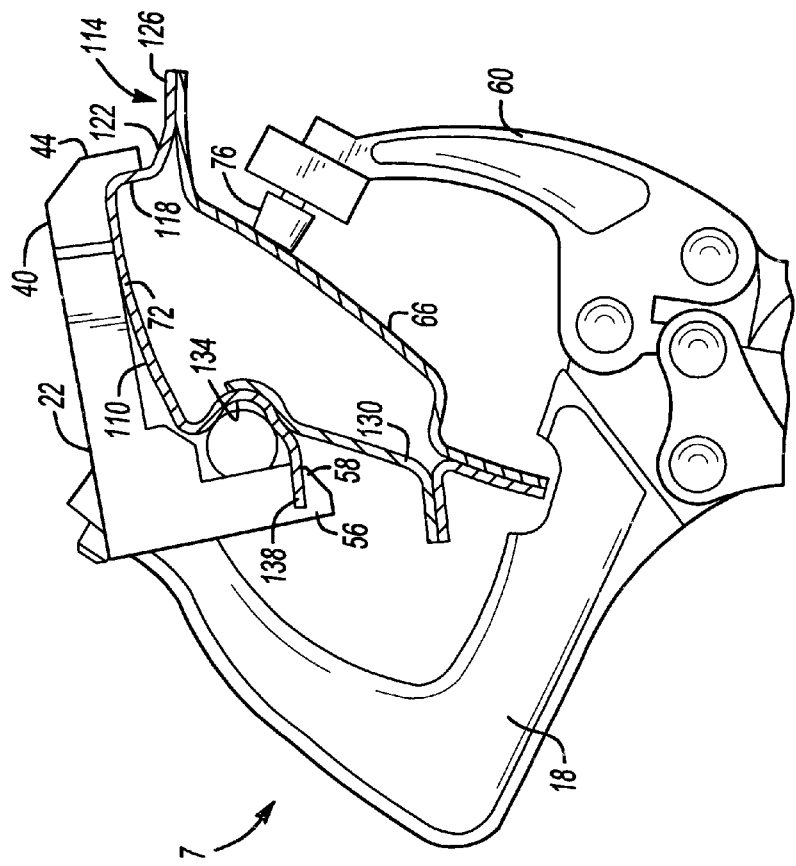
FIG. 4 is a sectional view of the assembly tool of the present invention shown clamped onto the C pillar taken along lines 4—4 of FIG. 2.
Figure 3:
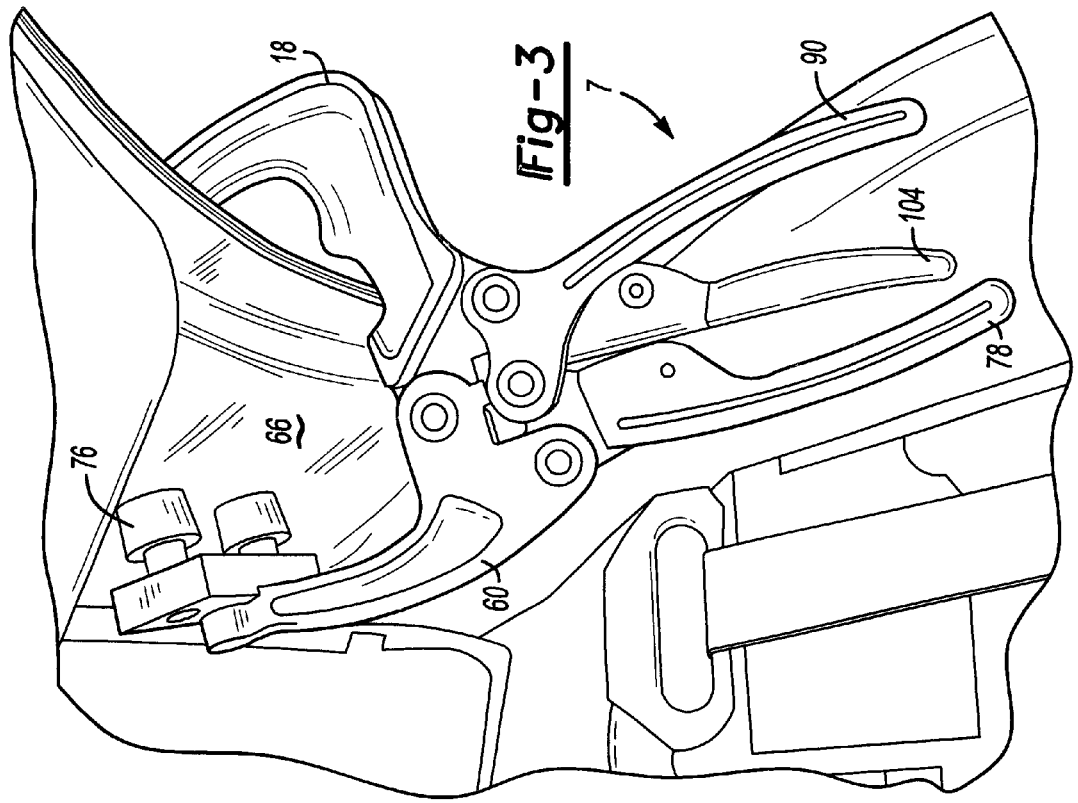
FIG. 3 is a view of the assembly tool in FIGS. 1 and 2, shown in the direction of arrow 3 of FIG. 1.
Figure 5:
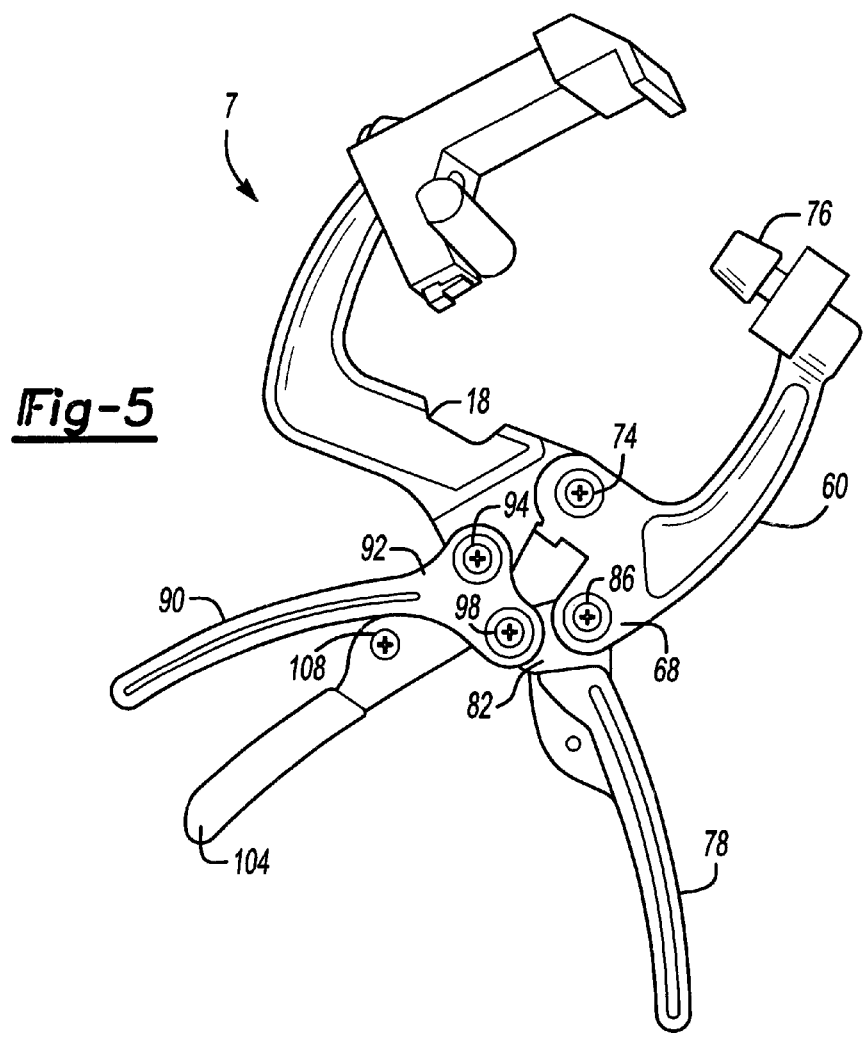
FIG. 5 is a top elevational view of the assembly tool shown in FIG. 1.

As best shown in FIG. 2, the housing also has a location stud 56. The location stud 56 has a finger 58. Tool 7 of the present invention also has a lower jaw 60. The lower jaw is provided for clamping contact against an inboard side 66 of the C pillar 10. The lower jaw has an extreme end 68 which is pivotally connected with the upper jaw along pivotal axis 74. The majority of the lower jaw 60 is fabricated from a rigid metal. The lower jaw 60 also has two elastomeric replaceable contacting members 76 for contacting the C pillar inboard surface 66.

The assembly tool 7 has a first lever 78. The first lever 78 has an extreme end 82. The first lever extreme end 82 is pivotally connected with the lower jaw 60 along pivotal axis 86. A second lever 90 has an extreme end 92. The extreme end 92 of the lever 90 is pivotally connected with the upper jaw 18 along pivotal axis 94. The second lever extreme end 92 is also pivotally connected with the extreme end 82 of the first lever along pivotal axis 98. Movement of the first lever 78 towards the second lever 90 causes the upper jaw 18 to move toward the lower jaw 60 in a clamping action. A release lever 104 is pivotally connected to the second lever 90 along pivotal axis 108 to allow for release of the jaws from one another.

The C pillar 10 has a show surface 110 which is a painted finish surface. The C pillar 10 has a glass depression 114 which includes a side surface portion 118 which is generally perpendicular to the show surface 110 and a side surface portion 122 which is continuous with the side surface portion 118 but is inclined. The inclined portion 122 is joined to a flange portion 126 which provides the glass support. The glass support 126 forms a flange with the inboard side 66. Generally opposite the inboard side 66 is door opening portion 130 of the C pillar which includes a weather strip channel 134 and a flange 138 for connection to the weather strip carrier (not shown). The flange 138 has a cut out or a locating depression (not shown) for mating with the location stud 56. The aforementioned stud finger 58 extends underneath the cut out or locating depression in the weather strip carrier flange 138. The placement of the location stud 56 into the cut out allows for the proper alignment of the assembly tool 7 on the C pillar 10.

Figure 6:
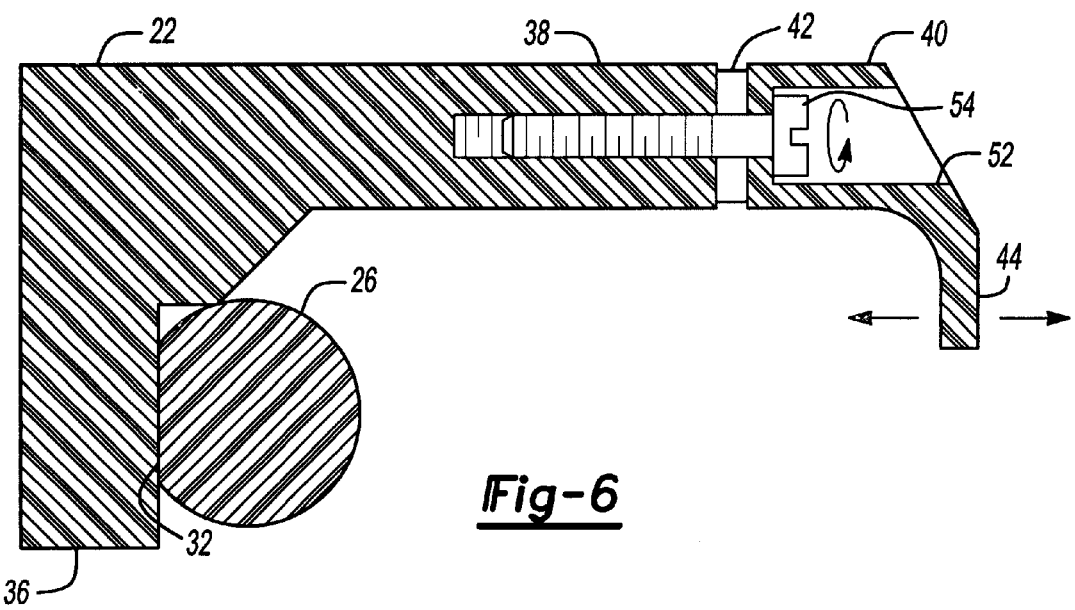
FIG. 6 is an enlarged sectional view of a finger portion of an upper jaw shown in the assembly tool of FIG. 5.

As mentioned previously, the lower jaw has two elastomeric contact members 76. The fine positioning of the lower jaw 60 can be accomplished by torquing the contact members 76 from the lower jaw via their screwed connection if so desired. Typically in operation, the lateral distance of the window opening 140 between the driver side and passenger side will be measured and will typically be known. The assembly tool 7 will be clamped down onto the C pillar 10. The set screws 54, as best shown in FIG. 6, will be adjusted and shims 42 will be added or removed to set the position of the finger 40. Finger extreme end 44 will be pushed up against a premolded seal 150 which is attached to the lateral edge 46 of the rear window glass panel 48 (during the installation of the rear window panel 48). The assembly tool 7 only has to stay on the C pillar for a few minutes after rear window panel installation before the rear window panel is laterally set. The assembly tool 7 can then be removed by use of release lever 90 and later be reused.

While the invention has been described in connection with a preferred embodiment, it will be understood that it is not intended to limit the invention to that particular embodiment. On the contrary it is endeavored to cover all alternatives, modifications and equivalent as may be included within the spirit and scope of the invention as encompassed by the description and as defined by the appended claims.

I claim:
1. A tool for setting a lateral position of a rear window panel placed on a window glass support surface of a rear window opening of an automotive vehicle comprising:

an upper jaw for extending over a C pillar of said automotive vehicle, said upper jaw having a weather strip channel contact member and an adjustable length finger extendable across a finish surface of the C pillar, said finger including an extreme edge window contacting surface for setting a lateral position of said rear window panel within said window glass support surface;

a lower jaw pivotally connected with said upper jaw for contacting and gripping an inboard surface of the C pillar of said vehicle;

a quick connect vice mechanism for closing said upper jaw and said lower jaw toward one another to grip said C pillar.

2. The tool of claim 1, wherein said upper jaw finger is length adjustable by rotating adjustment screws connecting said finger with a remainder of said upper jaw.

3. The toot of claim 1, wherein said lower jaw has a locating stud for alignment with a locating depression in said C pillar.

4. The tool of claim 1, wherein said weather strip channel contact member and said finger are fabricated from a polymeric material.

5. The tool of claim 1, wherein said lower jaw has elastomeric contact members for contacting said C pillar.

6. A tool for setting a lateral position of a rear window placed panel on a window glass support surface of a rear window opening in an automotive vehicle comprising:

an upper jaw for extending over a C pillar of said automotive vehicle, said upper jaw having a weather strip channel contact member;

said upper jaw having an adjustable length finger extendable across a finish surface of the C pillar, said finger having an extreme edge window contacting surface for contacting said window panel and setting the lateral position of said window panel;

a lower jaw with an extreme end pivotally connected to an extreme end of said upper jaw, said lower jaw having a contact surface for clamping contact against an inboard side of said C pillar;

a first lever having an extreme end pivotally connected with said lower jaw;

a second lever having an extreme end pivotally connected with said upper jaw and also pivotally connected with said first lever and wherein movement of said first lever toward said second lever said upper jaw and said lower jaw to move toward one another to clamp onto said C pillar; and a release lever pivotally connected with said second lever, wherein pivotal movement of said release lever causes said upper and lower jaws to be released from said C pillar.

7. The tool of claim 6, wherein said upper jaw finger is linearly adjustable by rotating adjustment screws connecting said finger with a remainder of said upper jaw.

8. The tool of claim 6, wherein said lower jaw has a locating stud for alignment with a locating depression in said C pillar.

9. The tool of claim 6, wherein said weather strip channel contact member and said finger are fabricated from a polymeric material.

10. The tool of claim 6, wherein said lower jaw has elastomeric contact members for contacting said C pillar.

* * * * *